(12) United States Patent
Jones et al.

(10) Patent No.: US 7,890,801 B2
(45) Date of Patent: Feb. 15, 2011

(54) METHOD AND COMPUTER-READABLE MEDIUM FOR VERIFYING AND SAVING AN ELECTRONIC DOCUMENT

(75) Inventors: Brian M. Jones, Redmond, WA (US); Carol L. Liu, Sammamish, WA (US); Chad B. Rothschiller, Edmonds, WA (US); Robert R. McCaughey, Sammamish, WA (US); Shawn A. Villaron, San Jose, CA (US); Su-Piao B. Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 574 days.

(21) Appl. No.: 12/021,770

(22) Filed: Jan. 29, 2008

(65) Prior Publication Data

US 2008/0126447 A1    May 29, 2008

Related U.S. Application Data

(63) Continuation of application No. 11/018,916, filed on Dec. 20, 2004, now Pat. No. 7,337,358.

(51) Int. Cl.
*G06F 11/00* (2006.01)
(52) U.S. Cl. .......................................... 714/15; 714/20
(58) Field of Classification Search .................. 714/15, 714/16, 17, 18, 19, 20, 42; 707/999.009, 707/999.01, 999.102
See application file for complete search history.

(56) References Cited

U.S. PATENT DOCUMENTS

| | | | |
|---|---|---|---|
| 5,491,808 A | 2/1996 | Geist, Jr. | 711/100 |
| 5,813,009 A | 9/1998 | Johnson et al. | |
| 6,243,831 B1 | 6/2001 | Mustafa et al. | |
| 6,567,826 B1 * | 5/2003 | Fischer et al. | 1/1 |
| 6,606,694 B2 | 8/2003 | Carteau | 711/162 |
| 6,816,984 B1 | 11/2004 | Snyder et al. | 714/38 |

(Continued)

FOREIGN PATENT DOCUMENTS

EP    1 093 063 A2    4/2001

(Continued)

OTHER PUBLICATIONS

European Search Report dated Feb. 13, 2006 cited in EP Application No. 05 11 1406.4.

(Continued)

*Primary Examiner*—Dieu-Minh Le
(74) *Attorney, Agent, or Firm*—Merchant & Gould

(57) ABSTRACT

A method and computer-readable medium are provided for saving the contents of a memory structure stored in a volatile memory. According to the method, corrupted portions of the memory structure are identified and an attempt is made to repair these portions. If the corrupted portions cannot be repaired, the saving of these portions is skipped. The uncorrupted and repaired portions of the memory structure are then saved to a data file stored on a mass storage device. If portions of the memory structure cannot be repaired or skipped, an attempt is made to save only the user data contained in the memory structure to the data file. In this manner, the user data contained in the memory structure may be saved to a data file even in cases of severe corruption.

20 Claims, 4 Drawing Sheets

U.S. PATENT DOCUMENTS

| | | | |
|---|---|---|---|
| 7,020,742 B2 * | 3/2006 | Beeston et al. | 711/111 |
| 7,337,358 B2 | 2/2008 | Jones et al. | 714/15 |
| 7,346,265 B2 | 3/2008 | Takigawa et al. | 386/94 |
| 7,464,104 B2 | 12/2008 | Jones et al. | 707/102 |
| 2003/0135478 A1 | 7/2003 | Marshall et al. | 707/1 |
| 2006/0136476 A1 | 6/2006 | Jones et al. | 707/102 |
| 2006/0143542 A1 | 6/2006 | Jones et al. | 714/42 |

FOREIGN PATENT DOCUMENTS

| | | |
|---|---|---|
| JP | 2003-339008 | 11/2003 |
| JP | 2004-185709 | 7/2004 |
| WO | WO 02/19075 A2 | 3/2002 |

OTHER PUBLICATIONS

European Search Report dated Feb. 17, 2006 cited in EP Application No. 05 11 1513.7.

U.S. Office Action dated May 2, 2007 cited in U.S. Appl. No. 11/018,914.

U.S. Office Action dated Mar. 25, 2008 cited in U.S. Appl. No. 11/018,914.

Australian Examiner's First Report dated Apr. 21, 2010 cited in Application No. 2005237165.

Chinese Official Action dated May 23, 2008 cited in Application No. 200510126788.1.

Japanese Office Action dated Nov. 7, 2008 cited in Japanese Application No. 2005-359519.

Mexican Office Action dated Aug. 21, 2008 cited in Application No. PA/a/2005/012557.

Mexican Office Action dated Aug. 21, 2008 cited in Application No. PA/a/2005/012558.

* cited by examiner

METHOD AND COMPUTER-READABLE MEDIUM FOR VERIFYING AND SAVING AN ELECTRONIC DOCUMENT

RELATED APPLICATIONS

This application is a Continuation of U.S. application Ser. No. 11/018,916 entitled "Method and Computer-Readable Medium for Verifying and Saving an Electronic Document" filed Dec. 20, 2004, and is related to co-pending U.S. application Ser. No. 11/018,914 entitled "Method and Computer-Readable Medium for Loading The Contents of a Data File" filed Dec. 20, 2004, which are incorporated herein by reference.

BACKGROUND OF THE INVENTION

Computers are utilized pervasively in today's society to perform a wide variety of tasks and for entertainment purposes. For instance, computers today are utilized for gaming, communications, research, and a virtually endless variety of other applications. One of the most common uses of computers, by both businesses and individuals alike, is the creation of electronic and printed documents. Computer application programs exist for creating all kinds of electronic documents, including spreadsheets, presentations, word processing documents, graphical documents such as diagrams and digital images, computer-aided design documents, and many other types of electronic documents.

Electronic documents often include content that is very important. Moreover, the content of an electronic document in many cases would be difficult or impossible to recreate if lost. For instance, highly complicated legal, business, marketing, and technical documents are often created that could not easily be recreated if the data file storing the document were corrupted or destroyed. Even in cases where the contents of a document could be easily be recreated, it can be very frustrating for a user to lose even a small portion of their data. Accordingly, it is very important that the data contained in electronic documents be protected against destruction and corruption.

Modern computer systems include error checking and other mechanisms to protect against the inadvertent corruption or loss of system memory. Unfortunately, even with these mechanisms in place, it is possible for a document stored in volatile system memory to become corrupted prior to saving the document to a data file on a mass storage device. Corruption may occur as the result of faulty memory, a faulty memory controller, memory management errors, loading faulty or corrupt data, a crash of the application program, and for other reasons. Because the loss of any amount of data can be frustrating to a user and because the time and effort necessary to recreate a corrupted document is often very great, it is important that as much data as possible be recovered from a corrupted document stored in volatile memory prior to saving the contents of the memory to a mass storage device.

It is with respect to these considerations and others that the various embodiments of the present invention have been made.

BRIEF SUMMARY OF THE INVENTION

In accordance with the present invention, the above and other problems are solved by a method and computer-readable medium for saving the contents of a document stored in a memory structure in a volatile memory to a data file stored on a mass storage device. Through the use of the various embodiments of the present invention, corrupted portions (also called "records") of the memory structure are identified during the save of a memory structure and an attempt is made to repair these portions. If the corrupted portions cannot be repaired, the saving of the corrupted portions is skipped. The uncorrupted and repaired portions of the memory structure are then saved to a data file on a mass storage device. If portions of the memory structure cannot be repaired or skipped, an attempt is made to save only the user data contained in the memory structure. In this manner, the user data contained in the memory structure may be saved to mass storage even in cases of severe corruption to the remainder of the memory structure.

According to one aspect of the invention, a method is provided for saving a memory structure stored in a volatile memory that includes one or more portions to a data file on a mass storage device. According to the method, a number of save modes are provided. In the "normal" save mode an attempt is made to save each portion of the memory structure in a normal fashion. The normal save mode includes minimal integrity checking on each of the portions of the memory structure so that the data can be saved quickly. If a portion of the memory structure is encountered that is missing or corrupt while in the normal mode, a second mode, called the "safe" save mode, is utilized to attempt to save the portions of the memory structure. A portion of the memory structure may be considered corrupt and therefore unsaveable if it causes an error in or crash of the application program attempting to save it, if the portion includes an unexpected data value, if the portion is missing data, if the portion includes invalid records or invalid extensible markup language ("XML"), and for other causes.

In the safe save mode extensive integrity checking is performed on each portion of the memory structure. In the safe save mode an attempt may also be made to repair the corrupted portions of the memory structure. Any portions that can be repaired are then saved. If a portion of the memory structure is encountered in the safe save mode that is missing or corrupt and which is also unrepairable, the saving of the unrepairable portion is skipped. If portions of the memory structure are encountered that are not repairable and for which saving cannot be skipped, a third save mode, called the "minimal" save mode, is utilized to attempt to save certain portions of the memory structure.

In the minimal save mode only the portions of the memory structure that include user data are saved. For instance, user data may comprise text data or numerical data that was entered by a user. As an example, if the memory structure contains data for a spreadsheet, an attempt is made in the minimal save mode to save only the data contained in the cells of the spreadsheet. No attempt is made in the minimal mode to save other types of data that may be contained in the memory structure such as embedded objects, pivot tables, auto filters, graphics, styles, formatting, and application or user preferences.

According to other embodiments of the invention, a computer-readable medium is also provided on which is stored computer-executable instructions. When the computer-executable instructions are executed by a computer, they cause the computer to provide a first saving mode for saving the contents of a memory structure that has one or more portions. In the first saving mode minimal integrity checking is performed on the portions of the memory structure as they are saved to a data file on a mass storage device. The computer-executable instructions also cause the computer to provide a second saving mode for saving the memory structure in which more extensive integrity checking is performed on the portions of the memory structure than in the first saving mode. In the second saving mode an attempt may also be made to repair portions that are unsaveable. Moreover, in the second saving mode the saving of any unsaveable portions is skipped.

The computer-executable instructions also cause the computer to begin saving the contents of a memory structure in the first saving mode. If a portion of the memory structure is determined to be unsaveable in the first saving mode, the computer switches to the second saving mode and attempts to save the memory structure in this saving mode. If, in the second saving mode, an unsaveable portion is encountered that may be repaired, the unsaveable portion is repaired and saved. If the unsaveable portion cannot be repaired, saving of the unsaveable portion is skipped.

According to an embodiment of the invention, the computer-executable instructions also cause the computer to provide a third saving mode wherein only the portions of the memory structure that include user data are saved. If, in the second saving mode, it is determined that a portion of the memory structure is unsaveable and that the unsaveable portion cannot be repaired or skipped, an attempt is made to save the contents of the memory structure in the third saving mode.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
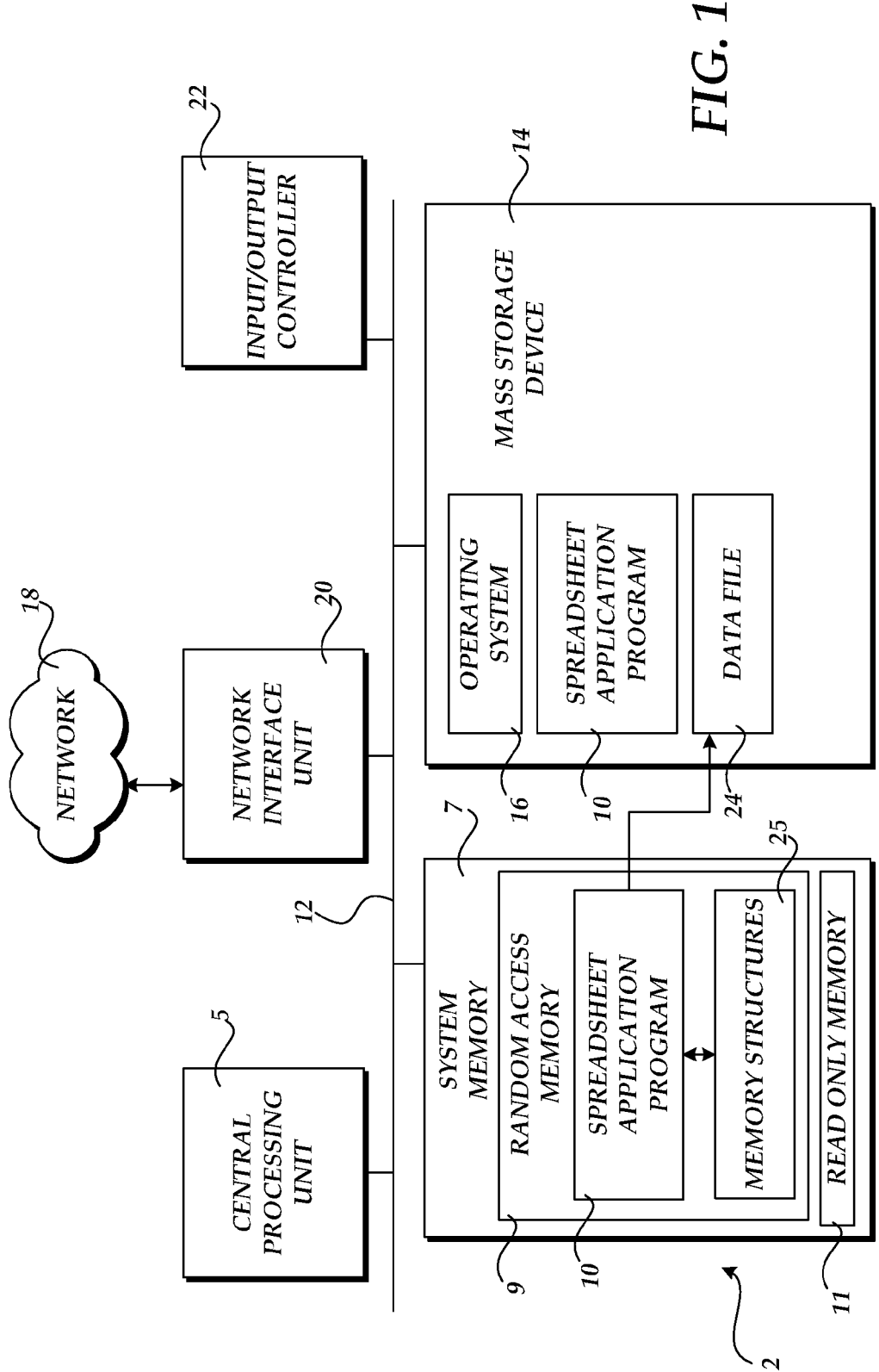
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a spreadsheet application program 10. As known to those skilled in the art, the spreadsheet application program 10 is operative to provide functionality for creating and editing electronic spreadsheets.

According to one embodiment of the invention, the spreadsheet application program 10 comprises the EXCEL spreadsheet application program from MICROSOFT CORPORATION. It should be appreciated, however, that other spreadsheet application programs from other manufacturers may be utilized to embody the various aspects of the present invention. It should also be appreciated that although the embodiments of the invention described herein are presented in the context of a spreadsheet application program, the invention may be utilized with any other type of application program that saves data to a data file. For instance, the embodiments of the invention described herein may be utilized within a word processing application program, a presentation application program, a drawing or computer-aided design application program, or a database application program.

As shown in FIG. 1, portions of the spreadsheet application program 10 may be loaded into the volatile RAM 9 during execution. Moreover, in conjunction with the creation and editing of a spreadsheet document, the spreadsheet application program 10 may utilize a portion of the RAM 9 to store the document. In particular, the spreadsheet application program 10 may utilize one or more memory structures 25 to store data representing the spreadsheet document. From time to time, either in response to a user request or in an automated fashion, the spreadsheet application program 10 is operative to save the contents of the memory structures 25 to a data file 24 stored on the mass storage device 14. The data file 24 contains data representing the various aspects of a spreadsheet document, such as user data including the contents of the spreadsheet cells, application preferences, formatting information, and other data corresponding to the various features provided by the spreadsheet application program 10. As will be described in greater detail below with respect to FIGS. 2-3B, a method for saving the contents of the memory structures 25 to the data file 24 is utilized by the spreadsheet application program 10 that accounts for the possibility of corruption in the memory structures 25 and that attempts to maximize the amount of user data that is saved to the data file 24 even if the memory structures 25 become corrupted.

Figure 2:
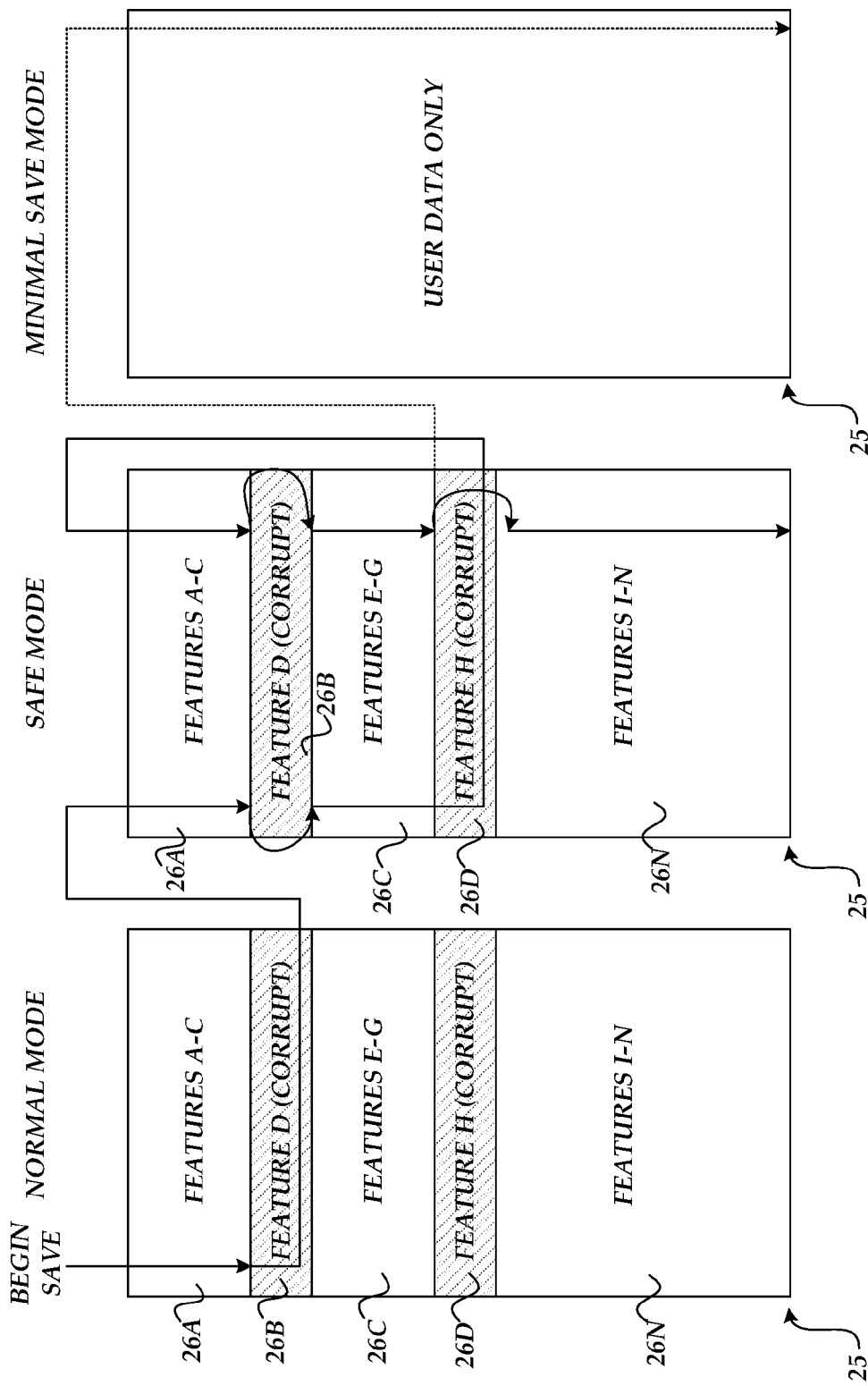
FIG. 2 is a block diagram illustrating aspects of a memory structure and the various saving modes provided by the embodiments of the invention.

Turning now to FIG. 2, additional details will be provided regarding the contents of the memory structures 25 and the operation of the saving mechanism utilized by the spreadsheet application program 10. As shown in FIG. 2, the memory structures 25 are subdivided into a number of portions 26A-26N. Each of the portions 26A-26N is utilized to store information relating to one or more features supported by the spreadsheet application program 10. Moreover, the information for different but related features may be stored in a single one of the portions 26A-26N. For instance, as shown in FIG. 2, the data for features A-C are stored in the portion 26A. The data for feature D is stored in portion 26B. The data for features E-G are stored in the portion 26C, and so on. User data may be stored in any of the portions 26A-26N. It should be appreciated that the data stored in the memory structures 25 may be stored in a non-contiguous fashion and that data for related features may be stored in separate memory locations.

As described briefly above, and shown in FIG. 2, it is possible for the data contained within the portions 26A-26N to be corrupted. Corruption may occur as the result of faulty memory, a faulty memory controller, memory management errors, loading faulty or corrupt data, a crash of the application program, and for other reasons. The data for a particular portion may also be determined to be missing. A portion of the memory structures 25 may be considered corrupt and therefore unsaveable if the portion causes an error in or crash of the application program attempting to save it, if the portion includes an unexpected data value, if the portion is missing data, if the portion includes invalid records or invalid extensible markup language ("XML"), and for other causes. In the illustrative memory structures 25 shown in FIG. 2, the portions 26B and 26D have become corrupted.

As described herein, portions of the memory structures 25 are saveable by the spreadsheet application program 10 despite the corruption of the portions 26B and 26D. FIG. 2 also illustrates this saving process utilizing the illustrative memory structures 25. In particular, the spreadsheet application program 10 begins saving the memory structures 25 in a normal saving mode. In the normal saving mode, minimal integrity checking is performed on the portions 26A-26N of the memory structures 25. If a corrupted portion of the memory structures 25 is encountered while saving in the normal mode, the spreadsheet application program 10 switches to a safe saving mode and begins saving the memory structures 25 from the beginning. For instance, as shown in FIG. 2, when the corrupted portion 26B is encountered in the normal saving mode, the saving mode is changed to the safe saving mode and saving begins again at the beginning of the memory structures 25. It should be appreciated that, according to embodiments of the invention, the saving of additional portions of the memory structures 25 need not return to the beginning.

In the safe saving mode, additional integrity checking is performed on the portions 26A-26N of the memory structures 25 as compared to the normal saving mode. Additionally, if a corrupted portion is encountered while saving in the safe mode, an attempt is made to repair the corrupted portion. If the corrupted portion can be repaired, that portion is saved. If the corrupted portion cannot be repaired, then the saving of the corrupted portion is skipped. For example, as shown in FIG. 2 the portion 26B is corrupted and cannot be repaired. Therefore, the saving of the portion 26B is skipped and the portion 26C is saved.

After the portion 26C has been saved, an attempt is then made to save the portion 26D. However, as shown in FIG. 2, the portion 26D is corrupt. Accordingly, an attempt is made to repair the portion 26D. If the portion 26D cannot be saved, the saving of the portion 26D is skipped and this process continues until the remaining portions have been saved or skipped. According to an embodiment of the invention, the saving of the memory structures 25 may return to the beginning of the memory structures 25 after an unsaveable portion has been encountered and determined to be unrepairable. This is illustrated in FIG. 2. Returning to the beginning of the memory structures 25 in this manner allows the saving of other portions of the data file 24 that are related to an unsaveable portion to be skipped even though the related portions may not be corrupt.

If, during the saving of the memory structures 25, a portion is encountered that is unsaveable and unrepairable, the spreadsheet application program 10 may switch to a third saving mode, called the minimal saving mode. In the minimal saving mode, an attempt is made to save only the user data from the memory structures 25. In particular, with regard to a text document an attempt is made to save only the text of the document. With regard to a spreadsheet document, an attempt is made to save the contents of the spreadsheet cells, including data input by a user, formulas, and formula generated data. In this manner, even if portions of the memory structures 25 are corrupt, some or all of the user data may be recovered and saved. This process is illustrated by the dotted line in FIG. 2 and would be performed if the portion 26D was determined to be unsaveable and unrepairable. Additional details regarding this process are provided below with respect to FIGS. 3A-3B.

Figure 3A:
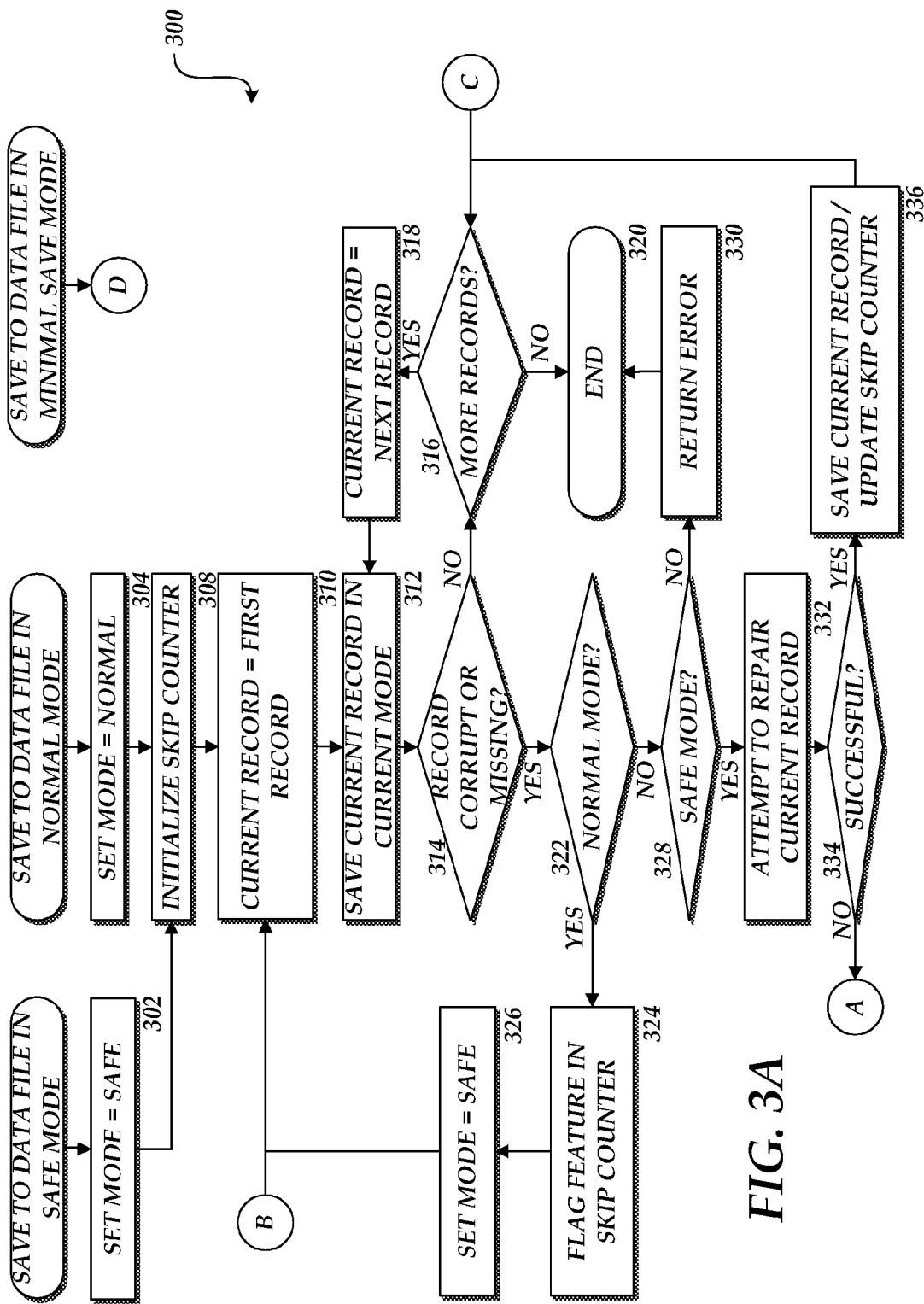
FIGS. 3A-3B are flow diagrams showing an illustrative process for saving a memory structure according to the various embodiments of the invention.
Figure 3B:
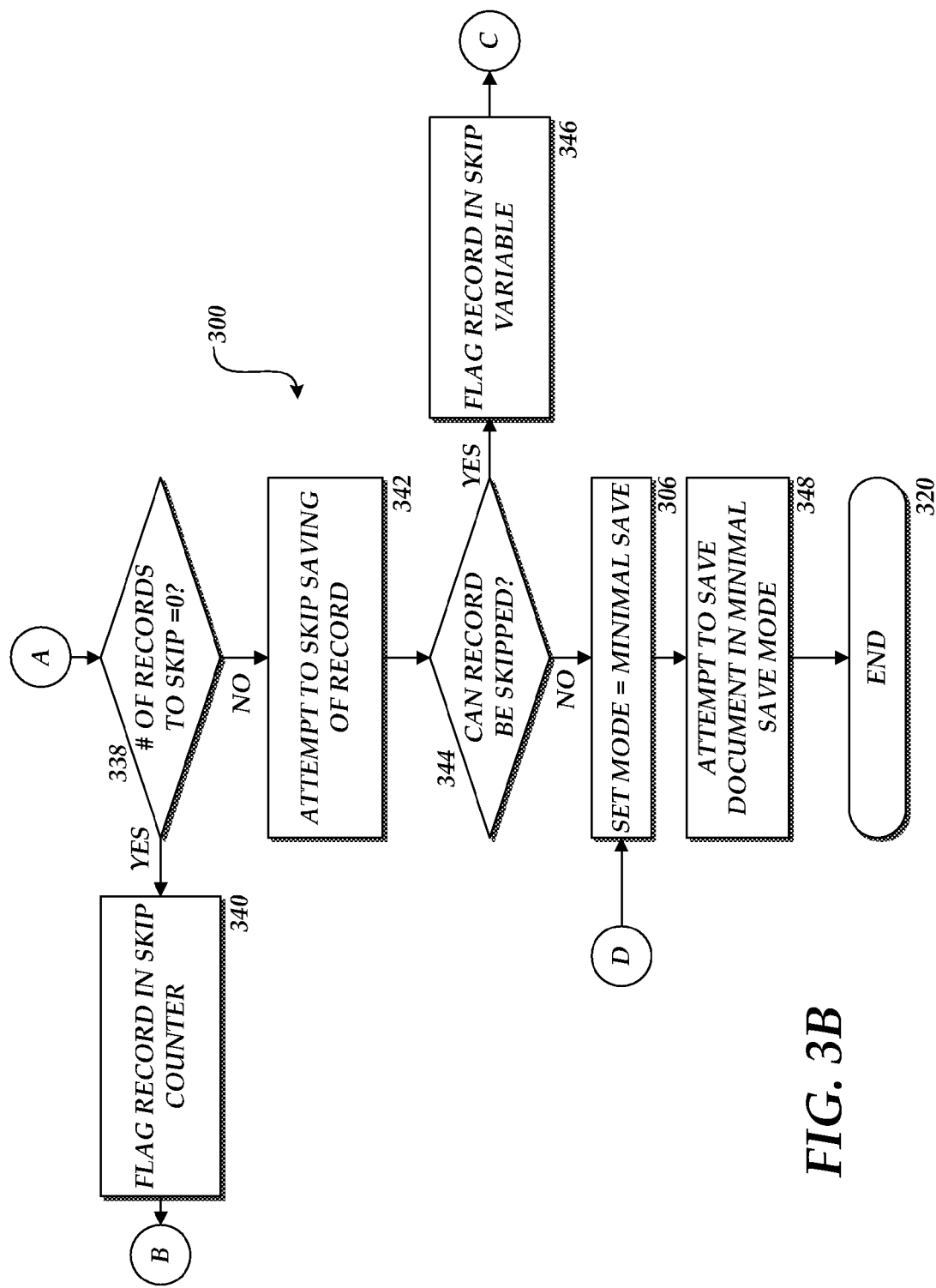

Referring now to FIGS. 3A-3B, the routine 300 will be described illustrating a process performed by the spreadsheet application program 10 for saving the contents of a memory structures 25. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3A-3B, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

It should be appreciated that the routine 300 utilizes several variables in its operation. In particular, the "mode" variable keeps track of the current saving mode. This variable may be set to either "safe," "normal," or "minimal." The "skip counter" variable keeps track of the memory structures 25 that should be skipped when the saving of the memory structures 25 returns to the beginning after encountering a corrupt portion. A "number of records to skip" variable describes the current number of sections that should be skipped on the current save attempt. A "current record" variable identifies the current section within the data file being processed. It should be appreciated that more or fewer variables may be utilized to perform the same task. Moreover, it should be appreciated that the routine 300 illustrated in FIGS. 3A and 3B represents but one possible implementation of the invention and that many other implementations will be apparent to those skilled in the art.

The routine 300 begins at either operation 302, 304, or 306. In particular, according to embodiments of the invention, a user interface may be provided that allows a user to select whether a document is saved normally (operation 304), is saved in the safe saving mode (operation 302), or is saved in the minimal saving mode (306). This user interface may be presented to a user when the user requests that a document be saved. Based on the user's selection within the user interface, the routine 300 begins its operation at either operation 302, 304, or 306.

If saving is to begin in the safe saving mode, the routine 300 begins at operation 302, where the mode variable is set to "safe." The routine 300 then continues to operation 308. If saving is to begin in the normal saving mode, the routine 300 begins at operation 304, where the mode variable is set to "normal." The routine 300 then continues from operation 304 to operation 308. If saving is to begin in the minimal saving mode, the routine begins at operation 306, where the mode variable is set to "minimal." From operation 306, the routine 300 continues to operation 348, described below.

At operation 308, the skip counter variable is initialized to indicate that no records should be skipped. The routine 300 then continues to operation 310 where the current record is set to the first record in the memory structures. The number of records to skip variable is set equal to the number of records to skip. On the first pass, this sets the number of records to skip equal to zero. From operation 310, the routine 300 continues to operation 312.

At operation 312, an attempt is made to save the current record in the current mode. For instance, if the mode variable is equal to "normal," minimal integrity checking is performed on the section being saved. If the mode variable is equal to "safe," additional integrity checking is performed. From operation 312, the routine 300 continues to operation 314, where a determination is made as to whether the current record is unsaveable (i.e. either corrupt or missing). If the current record is saveable, the routine 300 branches to operation 316 where a determination is made as to whether more records remain to be saved. If more records exist, the routine 300 branches from operation 316 to operation 318 where the current record variable is set to the next record in the memory structures 25. The routine 300 then continues to operation 312, where the next record is saved. If, at operation 316, it is determined that no additional records remain to be saved, the routine 300 branches to operation 320 where it ends. In this manner, all records are saved in the current mode if no corrupt or missing records exist.

It should be appreciated that, in embodiments of the invention, some integrity checks may be performed at the feature level as opposed to the record level. To perform such feature level integrity checking, an attempt is made to save all of the records for a particular feature. Then, a determination is made as to whether the data for the feature is valid. If the data is invalid, the skip data structure is updated with the records for the feature to be skipped and another attempt is made to save the file. File-level consistency checks may also be made in a similar manner.

If, at operation 314, it is determined that the current record is unsaveable, the routine 314 continues to operation 322 where a determination is made as to whether the current mode is the normal mode. If the current mode is the normal mode, the routine 300 branches to operation 324, where the skip counter variable is updated indicating that a portion of the memory structures 25 has been identified that may need to be skipped. The routine 300 then continues to operation 324, where the mode variable is set to "safe." In this manner, the saving mode is switched from normal to safe upon encountering an unsaveable portion of the memory structures 25. The routine 300 then returns back to operation 310, where the processing the of the data file returns to the beginning.

If, at operation 322, it is determined that the current saving mode is not the normal mode, the routine 300 continues to operation 328 where a determination is made as to whether the current saving mode is the safe mode. Because only the normal or safe saving modes should be possible values in this portion of the routine 300, the routine branches to operation 330 where an error is returned if the current saving mode is not the safe mode. The routine 300 then continues from operation 330 to operation 320, where it ends. If, however, at operation 328 it is determined that the current mode is the safe mode, the routine 300 continues to operation 332.

At operation 332, an attempt is made to repair the current record. At operation 334, a determination is made as to whether the current record was repairable. If the record was repairable, the routine 300 branches to operation 336, where the current record is saved. At operation 336, the skip counter variable is also updated to indicate that saving of the current record should not be skipped because the record was repairable. From operation 336, the routine 300 branches back to operation 316, where the remainder of the records of the memory structures 25 are processed in the manner described above.

If, at operation 334, it is determined that the current record could not be repaired, the routine 300 branches to operation 338. At operation 338, a determination is made as to whether the number of records to skip is equal to zero. This would be the case where saving was started in the normal mode and where the first corrupt record was encountered and the record is unrepairable. In this case, the routine 300 branches to operation 340, where the skip counter variable is updated to indicate that the record should be skipped. The routine 300 then returns to operation 310, where processing of the memory structures 25 returns to the beginning in the manner described above.

If, at operation 338, it is determined that the number of records to skip variable is not equal to zero, the routine 300 continues to operation 342, where an attempt is made to skip the saving of the current record. At operation 344 a determination is made as to whether the saving of the current record may be skipped. If saving of the current record can be skipped, the routine 300 branches to operation 346 where the record is flagged in the skip record variable. The routine then continues to operation 316, described above.

If, at operation 344, it is determined that the current record cannot be skipped, the routine 300 continues to operation 306 where the mode variable is set to "minimal." The routine 300 then continues to operation 348, where an attempt is made to save the memory structures 25 in the minimal mode. As described above, only user data is saved in the minimal mode. Moreover, an attempt is made to save as much of the user data as possible if the user data also is corrupted. The routine 300 then continues to operation 320, where it ends.

Based on the foregoing, it should be appreciated that the various embodiments of the invention include a method, system, apparatus, and computer-readable medium for saving the contents of a document stored in a structure in volatile memory to a data file stored on a mass storage device. The above specification, examples and data provide a complete description of the manufacture and use of the composition of the invention. Since many embodiments of the invention can be made without departing from the spirit and scope of the invention, the invention resides in the claims hereinafter appended.

What we claim is:

1. A computer-readable storage medium having computer-executable instructions stored thereon which, when executed by a computer, will cause the computer to:
   provide a first saving mode, a second saving mode, and a third saving mode;
   begin saving the contents of a memory structure having a plurality of data records in the first saving mode, wherein minimal integrity checking is performed on the at least one data record;
   determine while saving the contents of the memory structure in the first saving mode whether the at least one of the plurality of data records is unsaveable;
   in response to determining in the first saving mode that at least one of the plurality of data records is unsaveable, switch to the second saving mode;
   attempt to save the contents of the memory structure from its beginning in the second saving mode, wherein in the second saving mode additional integrity checks are performed on the plurality of data records as compared to the first mode;
   determine if the at least one unsaveable data record can be repaired;
   in response to determining that the at least one unsaveable data record can be repaired, repair the at least one unsaveable data record and saving the at least one repaired data record;
   in response to determining that the at least one unsaveable data records cannot be repaired, skip the at least one unsaveable and unrepairable data record;
   determine while saving the contents of the memory structure in the second saving mode whether the saving of the at least one unsaveable and unrepairable data records cannot be skipped; and
   in response to determining that the saving of the at least one unsaveable data record cannot be skipped while saving in the second saving mode, switch to the third saving mode wherein only user data stored in the memory structure is saved.

2. The computer-readable storage medium of claim 1, wherein one of the plurality of data records may be unsaveable if the record includes an unexpected data value.

3. The computer-readable storage medium of claim 1, wherein one of the plurality of data records may be unsaveable if the record is missing data.

4. The computer-readable storage medium of claim 1, wherein one of the plurality of data records may be unsaveable if the one of the plurality of data records includes invalid extensible markup language.

5. The computer-readable storage medium of claim 1, wherein one of the plurality of data records may be unsaveable if saving of the one of the plurality of data records by an application program causes the application program to crash.

6. The computer-readable storage medium of claim 1, wherein one of the plurality of data records may be unsaveable if the one of the plurality of data records is corrupt.

7. The computer-readable storage medium of claim 1, wherein one of the plurality of data records may be unsaveable if the one of the plurality of data records is missing.

8. The computer-readable storage medium of claim 1, wherein the contents of the memory structure comprises text data entered by a user.

9. The computer-readable storage medium of claim 1, wherein the contents of the memory structure comprises numerical data entered by a user.

10. The computer-readable storage medium of claim 1, wherein the memory structure having the plurality of data records represents an electronic document comprising at least one of a spreadsheet, a presentation, a word processing document, a graphical document, and a computer aided design document.

11. A method for saving the contents of a memory structure comprising a plurality of data records to a data file located on a mass storage device, the method comprising:
    providing a first saving mode, a second saving mode, and a third saving mode;
    attempting to save the contents of the memory structure to the data file in the first saving mode, wherein minimal integrity checking is performed on the plurality of data records while saving in the first saving mode;
    determining while saving the memory structure in the first saving mode whether at least one of the plurality of data records is unsaveable;
    in response to determining in the first saving mode that at least one of the plurality of data records is unsaveable, switching to the second saving mode;
    attempting to save the memory structure from its beginning in the second saving mode, wherein in the second saving mode additional integrity checks are performed on the plurality of data records as compared to the first mode;

determining if the at least one unsaveable data record can be repaired;

in response to determining that the at least one unsaveable data record can be repaired, repairing the at least one unsaveable data record and saving the at least one repaired data record;

in response to determining that the at least one unsaveable data records cannot be repaired, skipping the at least one unsaveable and unrepairable data record;

determining while saving the memory structure in the second saving mode whether the saving of at least one of the plurality of data records cannot be skipped; and in response to determining that the saving of at least one of the plurality of data records cannot be skipped while saving in the second saving mode, switching to the third saving mode wherein only the plurality of data records comprising user data stored in the memory structure is saved.

12. The method of claim 11, wherein a data record is unsaveable if it includes an unexpected data value, is missing data, includes invalid extensible markup language, causes an application program to crash when saving the record, is corrupt, or if the record is missing.

13. The method of claim 11, wherein the user data stored in the memory structure comprises at least one of text data, numerical data, formulas, and formula generated data.

14. The method of claim 11, further comprising counting the number of data records determined to be unsaveable.

15. The method of claim 11, further comprising counting the number of data records previously determined to be unsaveable that have been repaired and saved.

16. The method of claim 15, further comprising counting the number of unsaveable data records which cannot be repaired.

17. The method of claim 11, prior to the step of attempting to save the contents of the memory structure to the data file in the first saving mode, further comprising:

receiving, from a user, a selection of a saving mode; and saving the contents of the memory structure according to the selected saving mode.

18. The method of claim 11 wherein the memory structure comprising the plurality of data records represents an electronic document comprising at least one of a spreadsheet, a presentation, a word processing document, a graphical document, and a computer aided design document.

19. The method of claim 11, further comprising:

determining, while saving in the third saving mode, whether any of the plurality of data records comprising user data stored in the memory structure are missing or corrupt; and saving only the plurality of data records comprising user data stored in the memory structure that are not missing or corrupt.

20. A method for saving the contents of a memory structure comprising a plurality of data records to a data file located on a mass storage device, the method comprising:

providing a first saving mode, a second saving mode, and a third saving mode;

attempting to save the contents of the memory structure to the data file in the first saving mode, wherein minimal integrity checking is performed on the plurality of data records while saving in the first saving mode;

determining while saving the memory structure in the first saving mode whether at least one of the plurality of data records is unsaveable, wherein a data record is unsaveable if it includes an unexpected data value, is missing data, includes invalid extensible markup language, causes an application program to crash when saving the record, is corrupt, or if the record is missing;

in response to determining in the first saving mode that at least one of the plurality of data records is unsaveable, switching to the second saving mode;

attempting to save the memory structure from its beginning in the second saving mode, wherein in the second saving mode additional integrity checks are performed on the plurality of data records as compared to the first mode;

determining whether the at least one of the plurality of data records that is unsaveable can be repaired;

in response to determining that the at least one of the plurality of data records that is unsaveable can be repaired:

repairing the at least one of the plurality of data records that is unsaveable; and saving the at least one of the plurality of data records that has been repaired;

in response to determining that the at least one of the plurality of data records that is unsaveable cannot be repaired, skipping the saving of the at least one of the plurality of data records that is unsaveable and unrepairable;

determining while saving the memory structure in the second saving mode whether the saving of at least one of the plurality of data records cannot be skipped; and in response to determining that the saving of at least one of the plurality of data records cannot be skipped while saving in the second saving mode, switching to the third saving mode, wherein the third saving mode comprises:

determining whether any of the plurality of data records comprise user data, wherein user data comprises at least one of text data, numerical data, formulas, and formula generated data;

determining whether any of the plurality of data records comprising user data stored in the memory structure are missing or corrupt; and saving each of the plurality of data records comprising user data stored in the memory structure that is not missing or corrupt.

* * * * *